United States Patent [19]

Nakamura et al.

[11] 3,913,098

[45] Oct. 14, 1975

[54] LIGHT EMITTING FOUR LAYER DEVICE AND IMPROVED CIRCUITRY THEREOF

[75] Inventors: Tutomu Nakamura, Akashi; Saburo Matsuda, Nara; Yoichi Ito, Osaka, all of Japan

[73] Assignee: Hayakawa Denki Kogyo Kabushiki Kaisha, Osaka, Japan

[22] Filed: Mar. 23, 1973

[21] Appl. No.: 344,123

Related U.S. Application Data

[63] Continuation of Ser. No. 883,770, Dec. 10, 1969.

[30] Foreign Application Priority Data

Dec. 11, 1968 Japan ................................ 43-90658
Jan. 18, 1969 Japan ................................ 44-4311

[52] U.S. Cl. ............. 340/384 E; 340/244; 340/326; 340/331

[51] Int. Cl.$^{2}$ ............................................ G08B 3/00

[58] Field of Search ............. 340/384 E; 331/107 R; 313/108 D

[56] References Cited

UNITED STATES PATENTS

| | | | |
|---|---|---|---|
| 2,975,290 | 3/1961 | Spitzer | 331/107 |
| 3,102,242 | 8/1963 | Matarese | 331/107 |
| 3,192,320 | 6/1965 | Gibbons | 331/107 |
| 3,297,889 | 1/1967 | Breskend | 331/107 |
| 3,333,212 | 7/1967 | Vasseur | 331/107 |
| 3,443,166 | 5/1969 | Ing | 340/331 |
| 3,447,151 | 5/1969 | Potter | 340/384 E |
| 3,460,136 | 8/1969 | Jambazian | 340/384 E |
| 3,493,761 | 2/1970 | Brightman | 340/331 |

*Primary Examiner*—Thomas B. Habecker
*Attorney, Agent, or Firm*—Eugene E. Geoffrey, Jr.

[57] ABSTRACT

An oscillation device in which a semiconductor element is light emissive and exhibits a negative resistance characteristic is used, and more particularly an oscillation device in which the oscillation operation or switching operation of semiconductor light emitting element having a current controlled type regative resistance characteristic is utilized in order to derive therefrom a light output at normal temperature.

10 Claims, 27 Drawing Figures

INVENTORS
TUTOMU NAKAMURA
SABURO MATSUDA
YOICHI ITO
BY
ATTORNEY

INVENTORS
TUTOMU NAKAMURA
SABURO MATSUDA
YOICHI ITO
BY
ATTORNEY

INVENTORS
TUTOMU NAKAMURA
SABURO MATSUDA
YOICHI ITO
BY
ATTORNEY

INVENTORS
TUTOMU NAKAMURA
SABURO MATSUDA
YOICHI ITO
BY
ATTORNEY

INVENTORS
TUTOMU NAKAMURA
SABURO MATSUDA
YOICHI ITO
BY
ATTORNEY

LIGHT EMITTING FOUR LAYER DEVICE AND IMPROVED CIRCUITRY THEREOF

This application is a continuation of application Ser. No. 883,770 filed Dec. 10, 1969 entitled Oscillating Light Source and Circuit Therefor.

This invention relates to an oscillation device in which a semiconductor element is light emissive and exhibits a negative resistance characteristic is used, and more particularly an oscillation device in which the oscillation operation or switching operation or semiconductor light emitting element having a current controlled type negative resistance characteristic is utilized in order to derive therefrom a light output at normal temperature.

Rapid developments and changes have been seen recently in optoelectronics and especially in the fields of communications, computers and other related engineerings. Various kinds of semiconductor light emissive elements for laser light emission and field light emission have already been provided, and semiconductor elements such as tunnel diodes which do not emit light but exhibit negative resistance characteristics have been well known. However, such a semiconductor element which emits light and which exhibits a negative resistance characteristic is not practicably available at present. More specifically, although some specific semiconductor light emissive elements exhibit a negative resistance characteristic under certain conditions, they exhibit the negative resistance characteristic only at very low temperatures such as 77°K or they exhibit an unstable negative resistance characteristic at room temperature. Further, their light emission efficiency is as low as about 0.1%, their reproductivity is very low because the manufacturing processes of the elements are complicated and difficult, and thus these elements can be hardly used in practice. Therefore, it is hardly possible to use such elements as the above in a circuit which is to be operated at a normal temperature.

On the other hand, it has been found that said semiconductor light emissive element which exhibits a negative resistance characteristic can be adapted to have two stable states consisting of a cut-off region of a low current state and an active region of a high current state and also to have a negative resistance region. It has been also found that such semiconductor light emissive element as the above can be made to perform a switching operation between two stable states and an oscillation operation when load line is properly determined.

This invention utilizes a new semiconductor light emissive element made of gallium arsenide which exhibits a stable negative resistance characteristic at room temperature, which exhibits a light emission efficiency of about 3% and is far more than the conventional known ones, and further its manufacture is easy with a good reproductivity. As previously mentioned, this invention relates to an oscillation device in which said newly developed semiconductor light emissive element is used and an oscillator is formed by utilizing its switching operation or its oscillation operation.

The main object of this invention is to provide an oscillation device in which a semiconductor light emissive element exhibiting a negative resistance characteristic is used.

Another object of this invention is to provide an oscillation device having a simple structure which can perform a stable oscillation at room temperature without the need for complicated auxiliary means.

A further object of this invention is to provide an oscillation device from which an electrical output and a light output can be derived simultaneously and which can be easily coupled to other circuits wherefrom an output signal can be derived easily.

A still further object of this invention is to provide an oscillation device in which a semiconductor light emissive element capable of being switched at a high speed between two stable states is used and in which an oscillation at a high frequency is made possible.

The objects of this invention in general are accomplished by an oscillation device in which a semiconductor light emissive element having a negative resistance characteristic is used. The oscillation device comprises means for storing electrical signals supplied from the outside including an integrating circuit having a time constant and one or more semiconductor light emissive elements each of which emits light in response to said electrical signal stored by said storing means and which has a negative resistance characteristic which is switched between two stable states.

The negative resistance light emissive element having a negative resistance characteristic used in this invention is of four layer structure of PNPN, it exhibits a current controlled type negative resistance characteristic having a cut-off region of a low current state exhibiting such positive high resistance value that current I increases as the voltage V rises, an active region of a high current state exhibiting a positive low resistance value and a negative resistance region exhibiting such negative resistance value that the current I decreases as the voltage V rises, and its light emission intensity is proportional to the current flowing through the element. Such semiconductor light emissive element is so made by a single liquid phase epitaxial growing method developed by the inventors of this invention that P layer and N layer are grown alternatingly under a precise temperature control on a gallium arsenide substrate using only silicon as an impurity. The element is characterized in that the element emits light at normal temperature, it exhibits a negative resistance characteristic, and it mainly makes a field light emission. The light emission efficiency of said element is about 3% which is some tens of times the light emission of known elements, and its manufacture is easy with good reproductivity.

According to this invention, when the load line of the light emissive element is so determined that it intersects the V-I characteristic line within the negative resistance region and as the electrical signal supplied from the outside is being stored in said storage circuit the terminal voltage of the light emissive element gradually rises until it reaches the threshold voltage Vth within the cut-off region of the V-I characteristic curve. During this time, the current flowing through the light emissive element is very low, and the element emits little if any light. But, when a voltage higher than the threshold voltage is applied from the storage circuit to the light emissive element the operation region of the element is rapidly switched to the active region, thereby a high current is supplied thereto and a strong light is emitted. Under this condition, the internal resistance of the element largely decreases and attains a high conduction state, and therefore the charge stored in the storage circuit is rapidly discharged through the element. As a result, the terminal voltage of the light emissive element drops below its hold voltage Vh, its operation region is switched to the cut-off region, and the light emission stops. Then, in response to a successive electrical signal supplied from the outside the terminal voltage of the element rises, and the abovementioned operation is repeated. Accordingly, in the oscillation device of this kind the time during which the terminal voltage of the light emissive element reaches the threshold voltage Vth is determined by the potential of the electrical signal supplied from the outside and the time constant of the storage circuit, the latter determining the period of oscillation. Furthermore, an oscillation device can be constructed by determining a load line of the light emissive element which intersects the V-I characteristic curve within the active region or cut-off region and the switching characteristic of the element is utilized. In the latter case, the electrical signal to be supplied from the outside is made positive or negative, and the element may be switched from one stable state to the other stable state. In order to make the oscillation operation continuous the polarity of the input signal may be controlled or the switching of the stable state may be detected from the light output or electrical output from the light emissive element and thereby the operating region of the element may be inverted to the original operating region.

Other objects, features and operation in general of this invention will be clearly understood from the explanation hereinafter made referring to the attached drawings in which.

Figure 10:
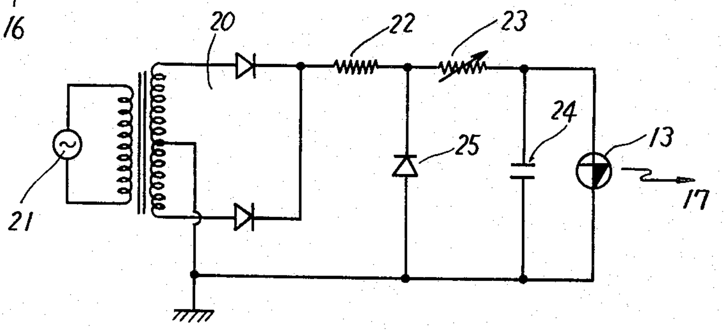
Figure 12:
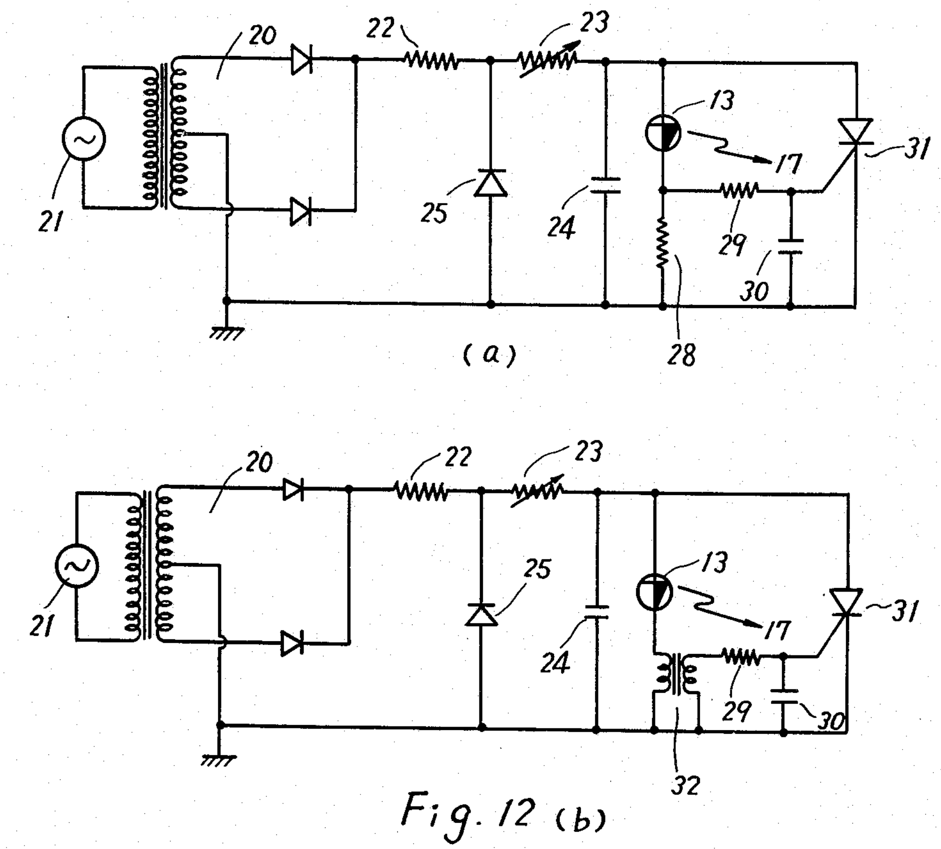

FIGS. 10, 12(*a*) and 12(*b*) are circuit diagrams of other modified embodiments of this invention.

Figure 11:
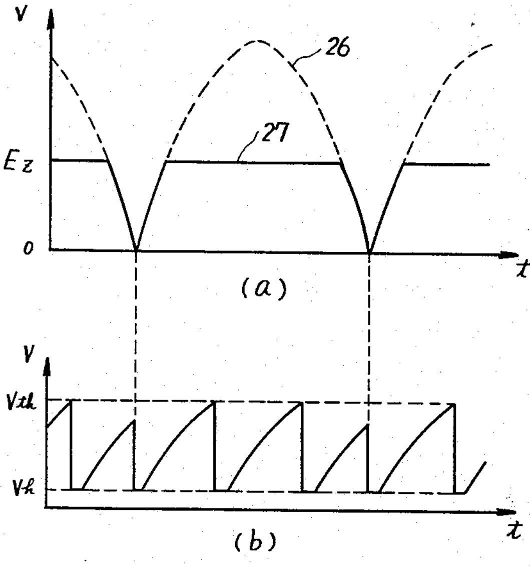

FIGS. 11(*a*), 11(*b*), 13(*a*), 13(*b*) and 13(*c*) are explanatory diagrams of the operation of the examples shown in FIGS. 10, 12(*a*) and 12(*b*).

Figure 14:
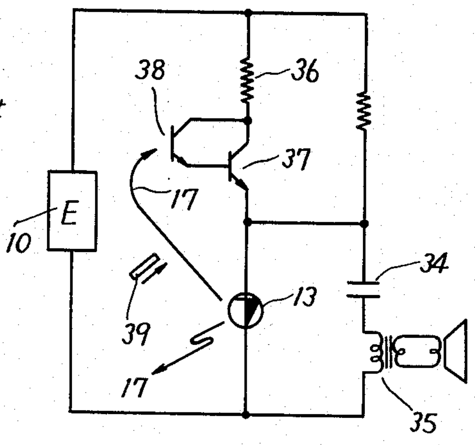

FIG. 14 is a circuit diagram of still another embodiment of this invention.

Figure 15:
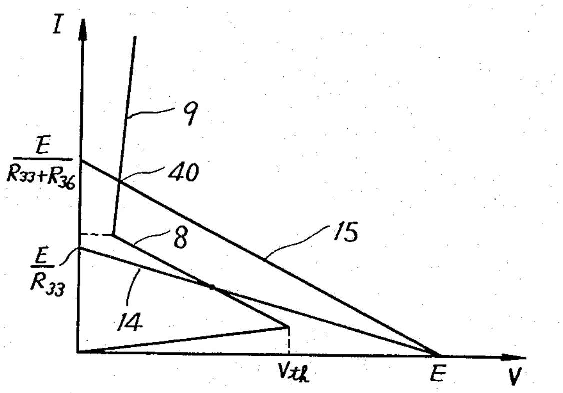

FIG. 15 is an explanatory diagram of the operation of the example shown in FIG. 14.

Figure 16:
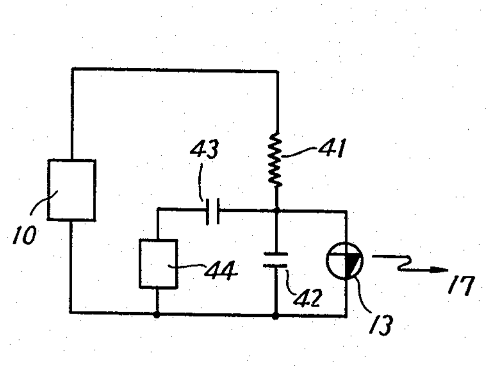

FIG. 16 is a circuit diagram of still another embodiment of this invention.

Figure 19:
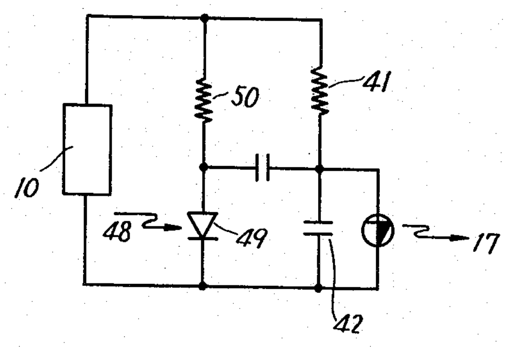

FIG. 19 is a circuit diagram of a modification of the embodiment shown in FIG. 16.

Figure 17:
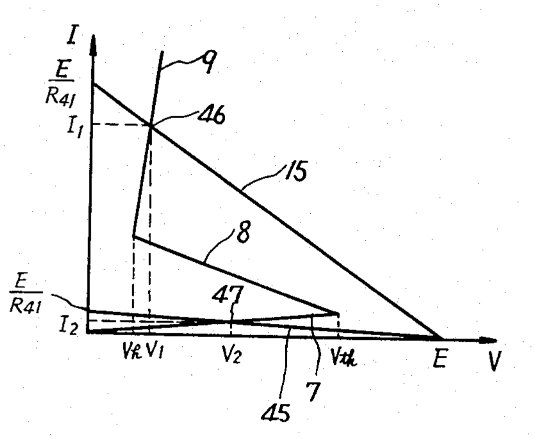
Figure 18:
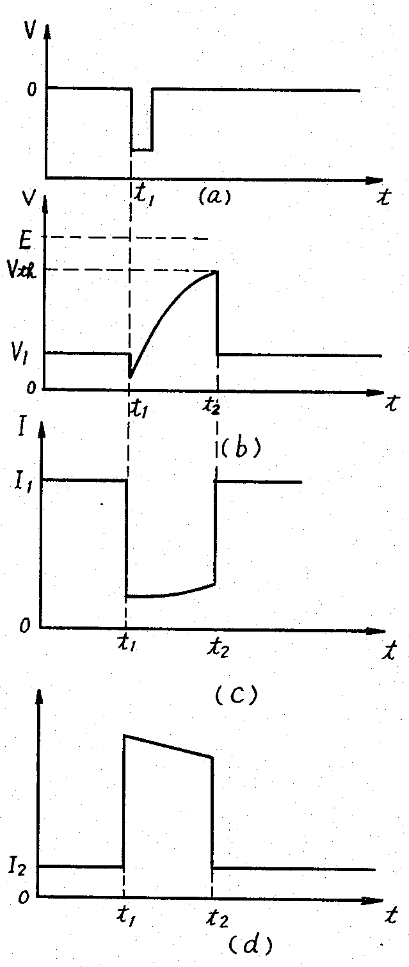

FIGS. 17, 18(*a*), 18(*b*) and 18(*c*) are explanatory diagrams of the embodiments shown in FIGS. 16 and 19.

Figure 20:
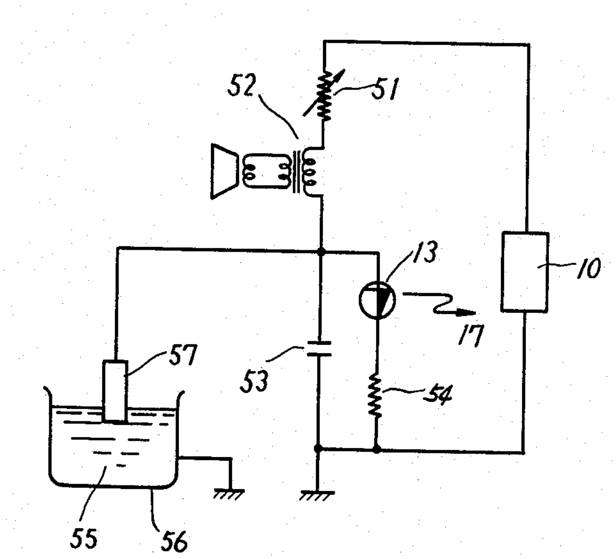

FIG. 20 is a circuit diagram of a further embodiment of this invention.

Figure 21:
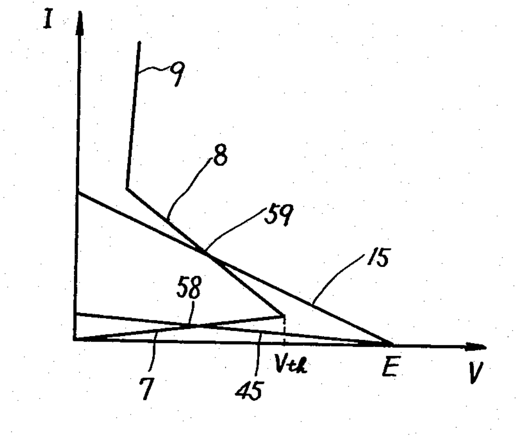

FIG. 21 is an explanatory diagram of the operation of the example shown in FIG. 20.

First, a brief explanation of method of making the semiconductor light emissive element used in this invention will be made.

Figure 1:
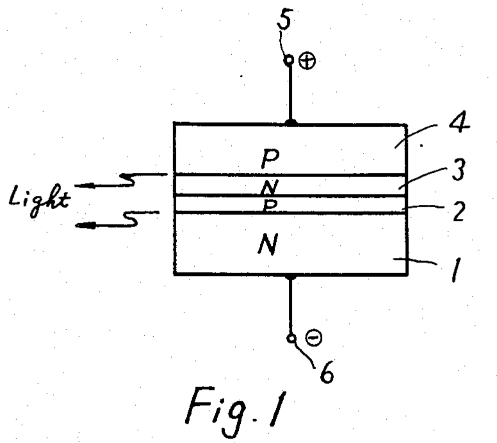
FIG. 1 is a structural diagram of a semiconductor light emissive element used in this invention.
Figure 2:
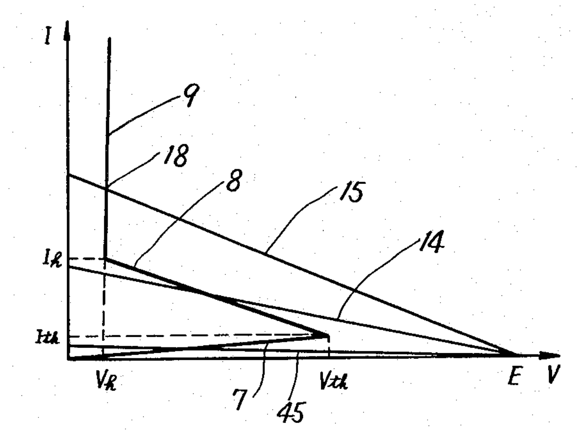
FIG. 2 shows V-I characteristic curve of the element shown in FIG. 1.
Figure 3:
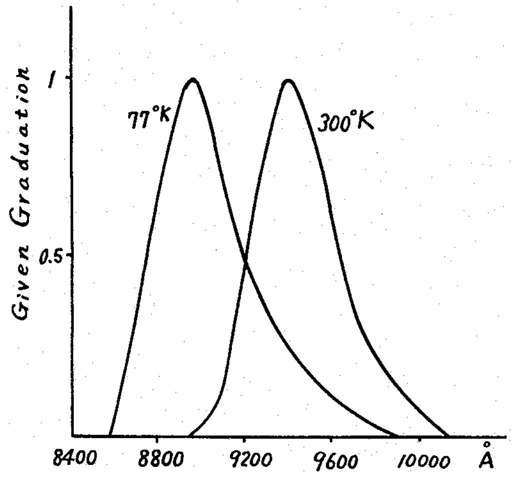
FIG. 3 is a light emission spectrum distribution diagram of said element.
Figure 4:
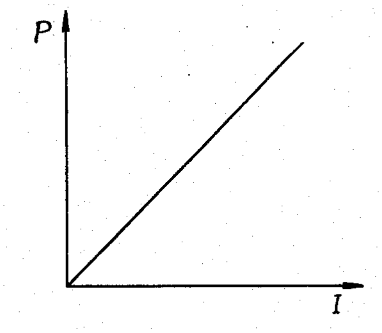
FIG. 4 shows a relation of a light emission intensity P with respect to current I of said element.

A single crystal substrate 1 made of gallium arsenide and a N type silicon dope single crystal having a free electron concentration of $6\times10^{17}/cm^3$ are used. As an impurity, silicon only is used, and a gallium arsenide semiconductor light emissive element of a four layer structure as shown in FIG. 1 is formed by one time or single liquid phase epitaxial growing method. In this case, N type substrate 1 of gallium arsenide is heated to 960°C, the temperature is dropped at temperature gradient of 0.2°C/min. in order to form a P layer 2 of about 5$\mu$ on the substrate 1, then from 958°C the temperature is dropped at the temperature gradient of 10°C/min. to form an N layer 3 of about 5$\mu$ on the P layer 2, further from 954°C the tempmerature is dropped at the temperature gradient of 0.2°C/min and thereby a P layer 4 of about 150–180$\mu$ is formed on the N layer 3. When a voltage V is applied between two terminals 5 and 6 of the semiconductor light emissive element thus made the element exhibits V-I characteristic comprising a cut-off region 7, a negative resistance region 8 and an active region 9 as shown in FIG. 2, and depnding upon the structure of the element the threshold voltage Vth and current Ith are 2–25 volts and 0.120mA and the hold voltage Vh and current Ih are 1.3–1.4 volts and 1–70mA. The light emission spectrum intensity distribution thereof is as shown in FIG. 3, and the light emission intensity P is proportional to the current I flowing therethrough as shown in FIG. 4. The values shown above are typical examples of the semiconductor light emissive element used in this invention, and the semiconductor light emissive elements to be used in this invention are not to be limited to such values as the above.

Figure 5:
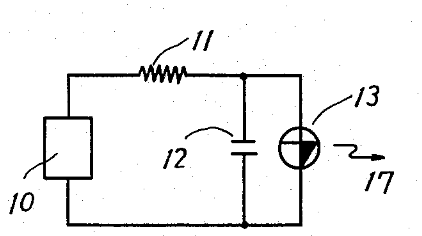
FIG. 5 is a diagram of a basic circuit of this invention.

FIG. 5 shows a basic circuit of this invention, in which an integrating circuit consisting of a resistor 11 and a capacitor 12 is connected to a power source device 10 which supplies a voltage E, and a semiconductor light emissive element 13 having the aforementioned negative resistance characteristic is connected between two terminals of the capacitor 12. In said circuit, when the resistance value of the load resistor 11 and the supply voltage E of the power source device 10 are properly selected in order to determine the bias point of the semiconductor light emissive element 13 and a load line 14 is arranged to intersect the V-I characteristic of the element 13 within negative resistance region 8 only as shown in FIG. 2, this circuit performs relaxation oscillation in such a manner as will be explained hereinafter.

Figure 6:
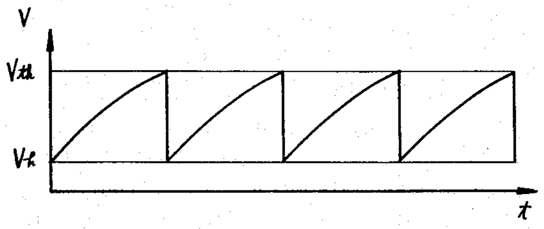
FIGS. 6 and 8 are explanatory diagrams of the operation of the examples shown in FIGS. 7 and 9.

At first, the capacitor 12 is charged with the supply voltage E, and its terminal voltage rises gradually until it reaches the threshold voltage Vth of the semiconductor light emissive element 13. During this time, the current flowing through the element 13 is very low, and the element 13 hardly emits light. When the terminal voltage of the capacitor 12 reaches above the threshold voltage Vth the operating point of the semiconductor light emissive element 13 is rapidly switched from the cut-off region 7 to the active region 9, thereby a large current flows through the element 13 resulting in a strong emission of light which is proportional to said flowing current, and the charge stored in the capacitor 12 is discharged within a short period of time through the element 13. When said discharge is over, the terminal voltage of the element 13 drops below the hold voltage Vh, and the operating point of the element 13 is switched from the active region 9 to the cut-off region 7 of a high resistance state. Then, the charging of the capacitor 12 by the power source device 10 is started again, and the abovementioned operation is repeated. FIG. 6 shows the terminal voltage waveshape of the capacitor 12 of this case.

Figures 7, 8:
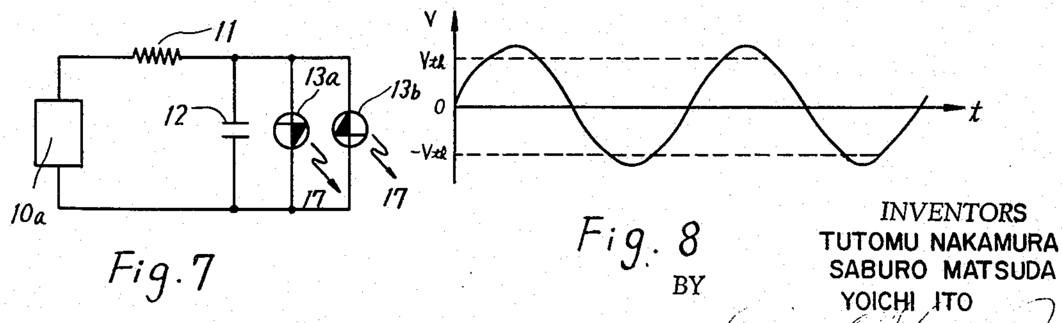
FIGS. 7 and 9 are diagrams of examples of modified embodiments of this invention.

FIG. 7 shows an embodiment of this invention in which an alternating current voltage as shown in FIG. 8 is supplied from the power source device 10*a* to an integrating circuit consisting of the resistor 11 and the capacitor 12. Semiconductor light emissive elements 13*a* and 13*b* having a characteristic as shown in FIG. 2 and connected in mutually opposite direction in parallel between two terminals of the capacitor 12 operate alternatingly in positive region and negative region of the alternating current voltage per each half cycle of the supplied alternating current voltage. Said operations of the semiconductor light emissive elements 13*a* and 13*b* will be easily understood from the explanatory operating diagram referred to in connection with FIG. 5. As mentioned above, in the example of FIG. 7, the elements operate within both of positive and negative regions of the alternating current voltage, but if operation in only one of said regions is desired either one of the semiconductor light emissive elements 13*a* and 13*b* may be removed.

All of the aforementioned oscillation phenomena occur only when the circuit is so designed that the load line 14 is made to intersect the V-I characteristic curve of the semiconductor light emissive element 13 within the negative resistance region 8 only as is shown in FIG. 2. If said intersection is within another region, the intersecting point in said region becomes a stable operating point, and, therefore, the oscillation phenomenon does not occur. Accordingly, the value $R_L$ of the load resistor 11 should be chosen larger than the absolute value $R_D$ of the negative resistance of the element 13 and the value $E/R_L$ should be chosen larger than the threshold current Ith but smaller than the hold current Ih.

Figure 9:
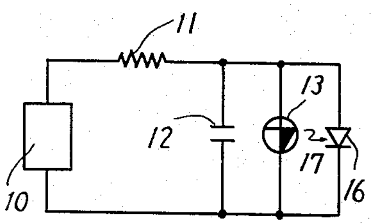

FIG. 9 shows an example of an embodiment of this invention in which the load line 15 of the semiconductor light emissive element 13 is made to intersect the V-I characteristic curve within the active region 9 as shown in FIG. 2 in order to produce oscillation. Portions corresponding to those of FIG. 5 are shown in same legends.

In FIG. 9, 16 is a light receiving element connected between two terminals of the capacitor 12. The light receiving element 16 is so arranged as to receive a light from the semiconductor light emissive element 13, when the element 13 is emitting light, the light receiving element 16 takes conductive state, and when the element 13 is not emitting light, it takes a cut-off state. In the example of FIG. 9, such photodiode as a solar battery is exemplified as the light receiving element 16, but the element 16 is not limited to the photodiode, and such photoconductive element as CdS or phototransistor which detects the presence of light and thereby an on-off control can be used.

The operation of the example shown in FIG. 9 is as follows.

The capacitor 12 is charged from the power source device 10 through the load resistor 11 at the time constant of $R_LC$ ($R_L$ is the resistance value of the load resistor 11 and C is the capacitance of the capacitor 12), and its terminal voltage rises gradually. When the terminal voltage of the capacitor 12 reaches the threshold voltage Vth of the semiconductor light emissive element 13, the element 13 is rapidly switched into the active region 9, and emits a strong light at the stable operating point 18. The light receiving element 16 detects said light, thereby its internal resistance largely decreases, and the element 16 assumes a conductive state. Then, the terminal voltage of the semiconductor light emissive element 13 drops, and when it reaches below the hold voltage Vth, the operating point of the element 13 is switched to the cut-off region 7 stopping the emission of light. In the cut-off region, the internal resistance of the light receiving element 16 becomes very high as there is no more incident light, and the charging to the capacitor 12 by the power source device 10 is started again. Thus the abovementioned operation is repeated. The terminal voltage waveform of the light emissive element 13 in this case is shown in FIG. 6.

As the example of FIG. 9 is so adapted that the light emission characteristic of the time of conduction of the semiconductor light emissive element 13 is utilized to switch the operating point of the element 13 to the cut-off region 7, it is not necessary to so choose the value of the load resistor 11 and the supply voltage E of the power source device that the load line intersects the V-I characteristic curve within the negative resistance region 8 only as is done in the examples shown in FIGS. 5 and 7, the selection of the load resistor 11 is therefore relatively free, the circuit designing is simpler, the frequency range of the oscillation is wider, and the operation is stable.

FIG. 10 shows an example of embodiment of this invention in which trigger light synchronous with the frequency of the alternating current signal is generated. In FIG. 10, 20 is a rectifying circuit of known type for full wave rectifying alternating current signal 21, an integrating circuit consisting of a series circuit of a resistor 22, a variable resistor 23 and a capacitor 24 is connected across the rectifier circuit 20, a semiconductor light emissive element 13 having such V-I characteristic as shown in FIG. 2 is connected across the capacitor 24, and a zener diode 25 having a zener voltage $E_Z$ higher than the threshold voltage Vth of the light emissive element 13 is connected between the connecting point of the resistor 22 and the variable resistor 23 and the negative terminal of the rectifier circuit 20. In this case, a constant voltage discharging tube or like may be used in place of the zener diode 25, if desired. The value of the variable resistor 23 is properly chosen, and the load line 14 of the light emissive element 13 is established so that it intersects the V-I characteristic curve of the element 13 within the negative resistance region 8.

The alternating current signal 21 is full wave rectified by the rectifier circuit 20, pulsating current 26 as is shown in FIG. 11(*a*) is supplied to the resistor 22, said pulsating current 26 is clipped at the zener voltage $E_Z$ of the zener diode 25, and a signal 27 shown in FIG. 11(*a*) is thereby supplied to the integrating circuit consisting of the variable resistor 23 and the capacitor 24. As a result, the terminal voltage of the capacitor 24 gradually rises in accordance with the resistance value of the resistor 22 and the time constant of the capacitor 24, when it reaches the threshold voltage Vth of the light emissive element 13, the operating point of the light emissive element 13 is rapidly switched to the active region 9, thereby a large current flows therethrough, and emission of light starts. As the load line 14 of the element 13 is established to intersect the V-I characteristic curve within the negative resistance region 8, there is no stable operating point within the active region 9. Therefore, corresponding to the discharge of the capacitor 24, the terminal voltage of the element 13 drops below the hold voltage Vh within a short period of time, the operating point of the element 13 is thereby switched to the cut-off region 7 resulting in a termination of light emission, and the capacitor 24 is charged again by the signal 27. Thus the same operation is repeated and the oscillation is effected.

When the pulsating current 26 due to the alternating current signal 21 drops below the zener voltage $E_Z$ the signal 27 supplied to the integrating circuit consisting of the capacitor 24 and the resistor 23 also drops, and the oscillation operation in a half cycle of the alternating current signal 21 terminates. The abovementioned oscillation operation is repeated for each half cycle of the alternating current signal 21, the terminal voltage of the capacitor 24 and the light emissive element 13 vary as shown in FIG. 11(*b*), and each time that said terminal voltage reaches the threshold voltage Vth the light emissive element 13 produces a strong light emission. In this case, the period of the light emission per each half cycle of the alternating current signal 21 can be varied freely by properly choosing the zener voltage $E_Z$, the resistance value of the variable resistor 23 and the capacitance of the capacitor 24.

The examples shown in FIGS. 12(*a*) and 12(*b*) utilize the oscillation device shown in FIG. 10, in which it is so adapted that a trigger light is generated for each half cycle of the alternating current signal 21, and portions corresponding to those of FIG. 10 are shown in same legends. The circuit shown in FIG. 12(*a*) is so arranged based on the circuit shown in FIG. 10 that a resistor 28 is inserted in series with the semiconductor light emissive element 13, an integrating circuit consisting of a series circuit of a resistor 29 and a capacitor 30 is connected across the resistor 28, and the connecting point of the capacitor 30 and the resistor 29 is connected to gate terminal of a silicon controlled rectifier element (SCR) connected in parallel with the capacitor 24. The circuit shown in FIG. 12(*b*) is a modification of the circuit shown in FIG. 11(*a*). It is so arranged based on the circuit of FIG. 12(*a*) that a transformer 32 is provided in place of the resistor 28 which is provided for detecting the current flowing through the semiconductor light emissive element 13.

Figure 13:
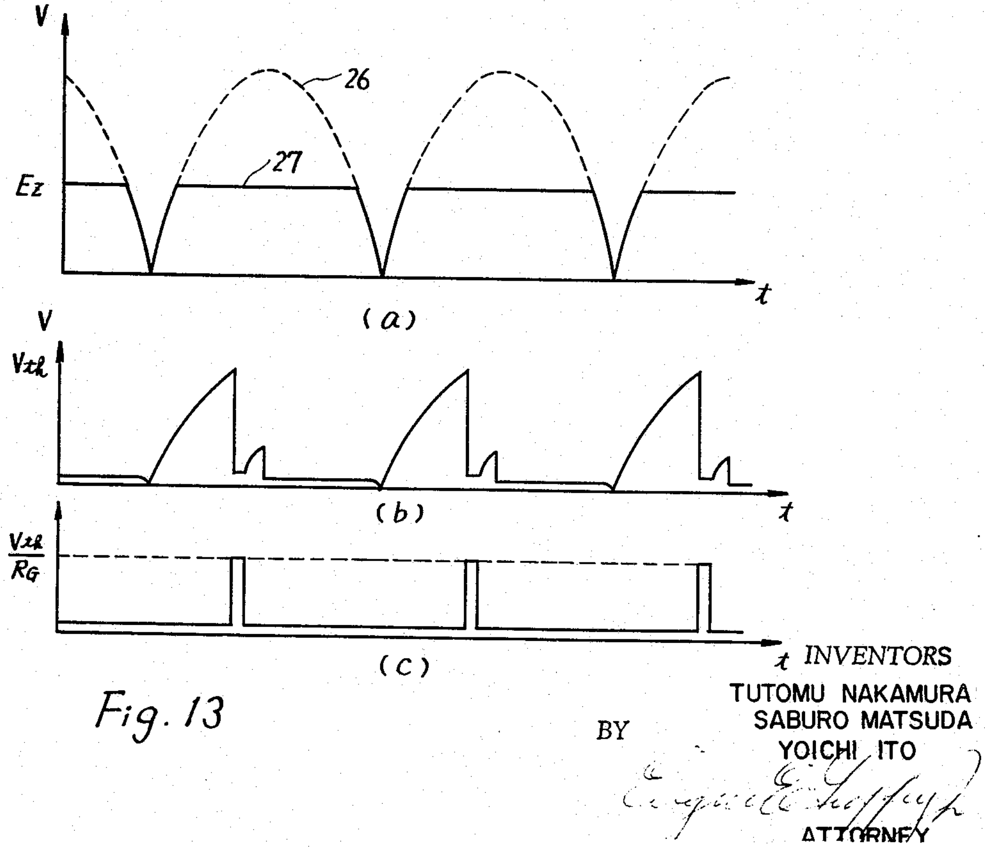

Accordingly, the circuits shown in FIGS. 12(*a*) and 12(*b*) operate in the same manner as the circuit shown in FIG. 10 so that when the signal 27 is supplied to the capacitor 24 the terminal voltage of the light emissive element 13 gradually rises as shown in FIG. 13(*b*), and when it finally reaches the threshold voltage Vth, light is emitted. When the element 13 emits light, a voltage is generated at the secondary winding of the transformer 32, said generated voltage is then stored in the capacitor 30 through the resistor 29, and it keeps the silicon controlled rectifier element 31 in conductive state until one cycle of the pulsating current 26 is completed. As a result, when the semiconductor light emissive element 13 emits light once charging the capacitor 24 is blocked within the same cycle of the pulsating current 26, the element 13 is kept in the cutoff region 7, and therefore light is not emitted. When the potential of the pulsating current 26 due to the alternating current signal 31 drops reaching substantially zero level, the silicon controlled rectifier element 31 assumes the open state again, and the abovementioned operation is repeated in the next cycle of the pulsating current 26. FIG. 13(*c*) shows that the semiconductor light emissive element 13 emits light once in each cycle of the pulsating current 26.

The circuit shown in FIGS. 10, 12(*a*) and 12(*b*) are so adapted that the same operation is repeated for each half cycle of the alternating current signal 21, but when the rectifier circuit 20 is a half wave rectifier circuit the oscillation device repeats same operation for each cycle of the alternating current signal 21.

FIG. 14 shows a circuit in which the bias point of the semiconductor light emissive element 13 is selectively switched between the negative resistance region 8 and the active region 9 at the time of shielding and non-shielding the light from the element 13 in order to detect the presence of shielding of said light. In FIG. 14, 10 is a power source device for supplying a direct current voltage E. A series circuit including a resistor 33, a capacitor 34 and a sound reproducing device 35 and a series circuit including a resistor 36, a transistor 37 and a semiconductcr light emissive element 13 having such V-I characteristic as shown in FIG. 2 are coupled with said device 10, the connecting point of the resistor 33 and the capacitor 34 and the connection point of the transistor 37 and the semiconductor light emissive element 13 are connected, further a phototransistor 38 is coupled between the base of the collector of the transistor 37, and it is so arranged that a part of output light of the light emissive element 13 becomes incident upon the phototransistor 38. In the drawing, 39 is a body to be detected which passes through an optical coupling path between the light emissive element 13 and the phototransistor 38. When a light is incident upon the phototransistor 38, the transistor 37 becomes conductive, the resistors 33 and 36 are connected in parallel, and when light is not incident upon the phototransistor 38 the transistor 37 is cut-off and the resistor 36 is cut-off from the circuit. The value $R_{33}$ of the resistor 33 is so adjusted that when a light is not incident upon the phototransistor 38 and the transistor 37 is cut-off, the load line 14 intersects the V-I characteristic curve of the element 13 within the negative resistance region 8 as is shown in FIG. 15, and the value $R_{36}$ of the resistor 36 is so adjusted that when the transistor 37 is in a conductive state the load line 15 formed by the parallel circuit of the resistors 33 and 36 intersects the V-I characteristic curve within the active region 9.

Accordingly, when the direct current voltage E is applied by the power source device 10 to the circuit, at first the resistor 36 is cut off from the circuit due to the cut off of the transistor 37, therefore the capacitor 34 is charged through the resistor 33, and thereby the terminal voltage of the semiconductor light emissive element 13 gradually rises. When said terminal voltage reaches the threshold voltage Vth, the charge stored in the capacitor 34 is discharged through the light emissive element 13, and the element 13 starts the emission of light. Then, the phototransistor 38 is excited to cause the transistor 37 to become conductive, thhe resistors 33 and 36 connected in parallel establish the operating point 40 of the light emissive element 13 within the stable active region, and the element 13 performs a continuous light emission. The current flowing through the element 13 maintains a constant value, and as the oscillation does not occur the sound reproducing device 35 does not emit an output signal.

When the light 17 from the light emissive element 13 to be introduced into the phototransistor 38 is cut-off by the body 39, the transistor 37 is cut off. Accordingly, the load resistance of the element 13 comprises only resistor 33 and its load line 14 intersects the V-I characteristic curve of the element 13 within the negative resistance region. Thus oscillation is performed in the same manner as in the example shown in FIG. 5. In this case, the light emissive element 13 produces intermittent light emission, thereby pulse current flows through the sound reproducing device 35, and a sound wave of a constant frequency is derived therefrom. When the light shielding of the phototransistor 38 is removed, the transistor 27 becomes conductive, the resistor 36 is inserted into the circuit, thereby the operating point 40 of the light emissive element 13 is switched to the active region 9, and a continuous light emission is performed resulting in a termination of the oscillation.

Thus according to said circuit, the presence of the body 39 can be recognized by discriminating whether the light from the light emissive element 13 is a continuous light or a pulse light or by detecting the presence of a sound wave derived from the sound reproducing device 35.

In the abovementioned example, the phototransistor is excited by the light 17 from the light emissive element 13, but it can be excited by a light from any other light source or by an ambient light. Furthermore, the sound reproducing device 35 may be inserted only when necessary, and it can be inserted in series with the light emissive element 13. Further, the switching circuit consisting of the phototransistor 38 and the transistor 37 can be substituted by other photosensitive elements.

FIG. 16 shows an example of a monostable multivibrator circuit as an embodiment of this invention, in which in response to trigger input signal, an output light having a time constant of a predetermined time is derived. In the drawing, 10 is a power source device for supplying a direct current voltage E. A series circuit of a resistor 41 and a capacitor 42 is connected to said power source device, and a semiconductor light emissive element 13 and a series circuit of a capacitor 43 and a signal generating device 44 for supplying electrical trigger pulse signal are coupled in parallel with the capacitor 42. The resistance value $R_{41}$ of the resistor 41 and the direct current voltage E of the power source device 10 are so adjusted that the load line 15 or 45 of the light emissive element 13 intersects the V-I characteristic curve of the element 13 within the active region 9 or within the cut-off region 7 as is shown in FIG. 17. When the adjustment is made so that the load line 15 intersects the characteristic curve within the active region 9, the element 13 operates at the stable operating point 46 within the active region 9 in response to the supply of the direct current voltage E from the power source device 10, thereby a current $I_1$ corresponding to the operating point 46 is supplied to the element 13, and a continuous light emission is performed. Under such condition, when a negative trigger signal as shown in FIG. 18(*a*) is supplied from the signal generating device 44 at the time $t_1$ the terminal voltage of the light emissive element 13 drops below the hold voltage Vh, the operating point of the element 13 is switched to the cut-off region 7, thereby little if any current flows through the element 13, and the light emission stops. Thereafter, when the capacitor 42 is charged by the direct current voltage E at the time constant of $R_{41}.C_{42}$ ($R_{41}$ is the resistance value of the resistor 41 and $C_{42}$ is the capacitance of the capacitor 42) the terminal voltage of the element 13 gradually rises, and it reaches the threshold voltage Vth at the time $t_2$. Therefore, the semiconductor light emissive element 13 at the time $t_2$ has its operating point switched to the active region 9, and it resumes its initial state. FIGS. 18(*a*), 18(*b*) and 18(*c*) show the signal waveforms of this case, in which (a) is negative voltage trigger signal waveform supplied from the signal generating device 44, (b) is terminal voltage waveform of the light emissive element 13, and (c) is current waveform flowing through the element 13.

Furthermore, when the adjustment is so made that the load line 45 intersects the V-I characteristic curve of the element 13 within the cut-off region 7, the circuit is so adapted that positive voltage trigger signal is applied by the signal generating device 44. The element 13 which at first emits very little light having a stable operating point 47 within the cut-off region 7 then has its operating point switched to the active region 9 by the positive voltage trigger signal applied at the time $t_1$, and then after a predetermined time said operating point is switched to the cut-off region 7 again, a current as shown in FIG. 18(*d*) is applied to the element 13.

Accordingly, from the circuit shown in FIG. 16 a light output having a predetermined time delay in accordance with the time constant of the circuit can be derived each time one trigger signal comes in.

The example shown in FIG. 19 is a modification of the one shown in FIG. 16. In this case, the signal generating device 44 is replaced by a light receiving element 49 which is excited by a light input 48 and from which an electrical trigger signal is obtained. Resistor 50 is a bias resistor and the operation of said circuit will be easily understood from the explanation of operation of the circuit shown in FIG. 16.

FIG. 20 shows a device in which the bias point of the light emissive element 13 is varied by the level of a liquid surface, and when the liquid level drops below a predetermined level an alarm is produced. In the drawing, 10 is a power source device for supplying a direct current voltage E, a series circuit including a resistor 51, a sound reproducing device 52 and a capacitor 53 is connected between two terminals of said power source device 10, and a series circuit including the light emissive element 13 and a resistor 54 for preventing excessive current is connected between two terminals of the capacitor 53. A conductive container 56 for containing a liquid 55 to be detected is connected to one of the terminals of the capacitor 53, a detector 57 is placed on the liquid surface of the liquid 55, and said detector 57 is connected to the other terminal of the capacitor 53. Under the condition that the liquid 55 is in contact with the detector 57, a resistance is formed between the detector 57 and the container 56. The resistor 51 is so adjusted that by said resistance a voltage below the threshold voltage Vth is applied to the light emissive element 13, further the load line 45 of the element 13 is made to intersect the V-I characteristic curve of the element 13 within the cut-off region 7 as is shown in FIG. 21, and under the condition that the detector 57 does not contact with the liquid 55, the load line 15 due to the resistor 51 and the sound reproducing device 52 is made to intersect said V-I characteristic curve within the negative resistance region 8 as is shown in FIG. 21.

Accordingly, under the condition that the detector 57 is in contact with the liquid 55, the light emissive element 13 operates at the stable operating point 58 within the cut-off region 7, thereby a predetermined constant current flows therethrough, and the element 13 emits little if any light. When the liquid surface of the liquid 55 falls below a predetermined level, the liquid no longer contacts the detector 57 and an oscillation circuit is formed because the load line 15 of the light emissive element 13 is adjusted to intersect the V-I characteristic curve within the negative resistance region 8, thereby the element 13 performs intermittent light emission. At the same time a pulselike current flows through the sound reproducing device 52, and the device 52 generates a sound wave of a constant frequency.

Thus when the pulsed light from the light emissive element 13 or the sound wave generated by the sound reproducing device 52 is detected the drop of the liquid surface below a predetermined level can be recognized. Although in the example shown in FIG. 20 the sound reproducing device 52 is provided, it is not always necessary.

In the aforementioned various circuits, the light output of the semiconductor light emissive element 13 is used as an output signal, but it will be obvious that said circuits can be so designed that electrical output signals are simultaneously derived from the terminal voltage of the light emissive element 13, the terminal voltage of the capacitor which constitutes in part the integrating circuit or the terminal voltage of the load resistor. Further, although the semiconductor light emissive element 13 as used in this invention is shown to emit an infrared light as in the case of FIG. 3, it will be apparent that if it is desired to directly recognize the output light of the element 13 known means for converting the infrared light into a visible light may be used.

In the description made above, the basic and novel features of this invention are illustrated, explained and pointed out referring to preferred examples of embodiments of the invention, but various omissions, substitutions, and modifications in the construction, details and operation as explained and illustrated can be easily made without deviating from the spirit of this invention by people skilled in the art.

What is claimed is:

1. Apparatus for producing light and electrical pulses comprising a two terminal PNPN four-layer light emissive semiconductor element formed by a single epitaxial process exhibiting a forward voltage current characteristic including a current-controlled negative resistance region with a high impedance state and a low impedance state in the forward voltage area, said semiconductor element showing light emission at room temperature at the high and low impedance states included in the negative resistance region in the forward voltage area wherein the intensity increases with the current flowing through said element in both the positive and negative regions of the forward voltage area, impedance means connected in series with one terminal of said element, forward biasing means connected across aid impedance means and said element in series to bias said element in the forward voltage area, said biasing means and said impedance means being selected to provide a load line which intersects the voltage-current characteristic at only one point, said point being in said negative resistance region, capacitor means connected in shunt with said semiconductor element, said capacitor being alternately charged and discharged to concurrently provide a pulsating electrical (output) current and a pulsating light output from said semiconductor element, whereby said current and output may be selectively utilized to activate means responsive thereto.

2. Apparatus for producing light and electrical pulses according to claim 1 wherein said forward biasing means constitutes a variable voltage source alternating with time about a zero axis.

3. Apparatus for producing light and electrical pulses according to claim 1 wherein said forward biasing means constitutes power source including a constant voltage control.

4. Apparatus for producing light and electrical pulses according to claim 1 wherein the last said means comprises means connected effectively in series with said semiconductor element and storing a charge corresponding to the current flowing through said element and a switching element controlled by the charge stored by the last said means and the voltage produced by said forward biasing means.

5. Apparatus for producing light and electrical pulses according to claim 1 including a switching element connected in parallel with said semiconductor element and controlled by a liquid level, said switching element shifting the operating point of said semiconductor element to the positive resistance region of the voltage-current characteristic thereof.

6. Apparatus for producing light and electrical pulses according to claim 1 including means connected in parallel with said semiconductor element and supplying positive and negative trigger signals thereto to shift the operating characteristic selectively between the constant voltage region and the positive resistance region of the voltage-current characteristic of said semiconductor element.

7. Apparatus for producing light and electrical pulses according to claim 1 wherein said impedance means has a value greater than the value of the negative resistance of said element and the voltage of said biasing means divided by the value of said impedance means being greater than the threshold current of said element but smaller than the hold current thereof.

8. Apparatus for producing light and electrical pulses comprising a two terminal PNPN four-layer light emissive semiconductor element formed by a single epitixial process exhibiting a forward voltage current characteristic including a current-controlled negative resistance region with a high impedance state and a low impedance state in the forward voltage area, said semiconductor element showing light emission at room temperature at the high and low impedance states included in the negative resistance region in the forward voltage area wherein the intensity increases with the current flowing through said element in both the positive and negative regions of the forward voltage area, forward biasing means said impedance means being selected to provide a load line which intersects the voltage-current characteristic at only one point, said point being in said negative resistance region, capacitor means connected in shunt with said semiconductor element, said capacitor being alternately charged and discharged to concurrently provide a pulsating electrical current and a pulsating light output from said semiconductor element whereby said current may be selectively utilized to activate means responsive thereto, the last said means including a light responsive switching element electrically interconnected with said semiconductor element and responsive to light emitted by said semiconductor element to modify the characteristics of the semiconductor element output.

9. Apparatus for producing light and electrical pulses comprising a two terminal PNPN four-layer light emissive semiconductor element formed by a single epitaxial process exhibiting a forward voltage current characteristic including a current-controlled negative resistance region with a high impedance state and a low impedance state in the forward voltage area, said semiconductor element showing light emission at roon temperature at the high and low impedance states included in the negative resistance region in the forward voltage area wherein the intensity increases with the current flowing through said element in both the positive and negative regions of the forward voltage area, impedance means connected in series with one terminal of said element, forward biasing means connected across said impedance means and said element in series to bias said element in the foroward voltage area, said biasing means and said impedance means being selected to provide a load line which intersects the voltage-current characteristic at only one point, said point being in said negative resistance region, capacitor means connected in shunt with said semiconductor element, said capacitor being alternately charged and discharged to concurrently provide a pulsating electrical current and a pulsating light output from said semiconductor element whereby said current and output may be selectively utilized to activate means responsive thereto, and second impedance means and a series connected light responsive switch interconnected in parallel with the first impedance means, said switch being responsive to light produced by said semiconductor element to connect said second impedance means in circuit with said first impedance means to shift the operation of said semiconductor element to the constant voltage region of the voltage-current characteristic thereof.

10. Apparatus for producing light and electrical pulses according to claim 9 including an electroacoustic transducer interconnected with and driven by said semiconductor element.

* * * * *